(12) United States Patent
Robertson et al.

(10) Patent No.: US 10,441,887 B2
(45) Date of Patent: *Oct. 15, 2019

(54) NETWORKED GAMING HEADSET

(71) Applicant: Voyetra Turtle Beach, Inc., Valhalla, NY (US)

(72) Inventors: Kevin Arthur Robertson, San Jose, CA (US); Richard Kulavik, San Jose, CA (US)

(73) Assignee: VOYETRA TURTLE BEACH, INC., Valhalla, NY (US)

( * ) Notice: Subject to any disclaimer, the term of this patent is extended or adjusted under 35 U.S.C. 154(b) by 559 days.

This patent is subject to a terminal disclaimer.

(21) Appl. No.: 15/095,769

(22) Filed: Apr. 11, 2016

(65) Prior Publication Data

US 2016/0220904 A1 Aug. 4, 2016

Related U.S. Application Data

(63) Continuation of application No. 14/477,421, filed on Sep. 4, 2014, now Pat. No. 9,313,569.

(Continued)

(51) Int. Cl.
*A63F 13/54* (2014.01)
*G06F 17/00* (2019.01)
*H04R 1/10* (2006.01)
*H04R 27/00* (2006.01)
*A63F 13/98* (2014.01)
*A63F 13/77* (2014.01)

(Continued)

(52) U.S. Cl.
CPC ............ *A63F 13/54* (2014.09); *A63F 13/215* (2014.09); *A63F 13/35* (2014.09); *A63F 13/77* (2014.09); *A63F 13/98* (2014.09); *H04R 1/1091* (2013.01); *H04R 3/00* (2013.01); *H04R 27/00* (2013.01); *H04R 2201/107* (2013.01); *H04R 2227/003* (2013.01)

(58) Field of Classification Search
CPC .... H04R 27/00; H04R 3/00; H04R 2227/003; H04R 1/1091; H04R 2201/107; A63F 13/54; A63F 13/215; A63F 13/35; A63F 13/77; A63F 13/98; G06F 17/00
USPC ......... 381/311, 74, 370, 384, 314, 315, 309; 700/94
See application file for complete search history.

(56) References Cited

U.S. PATENT DOCUMENTS

2011/0191686 A1* 8/2011 Wolff-Petersen ..... G06F 15/177
715/735
2012/0014553 A1* 1/2012 Bonanno ................ H03G 3/341
381/364

* cited by examiner

*Primary Examiner* — Paul Kim
(74) *Attorney, Agent, or Firm* — McAndrews, Held & Malloy, Ltd.

(57) ABSTRACT

In an audio setup comprising a headset configurable to process audio for a player, a headset preset may be downloaded from a central headset preset depository into the headset, and the headset may be configured based on the headset preset, for processing audio for the player when the player is participating in, for example, an online multiplayer game. The downloaded headset preset is uploaded into the central headset preset depository by a second player, and the headset preset comprises values for one or more configurable parameter settings relating to operation or functions of the headset. Information used in facilitating access to the headset preset in the central headset preset depository may be received from the second player. The information may comprise a token (or similar identifier) assigned to the headset preset at an audio setup associated with the second player.

17 Claims, 12 Drawing Sheets

Related U.S. Application Data

(60) Provisional application No. 61/894,161, filed on Oct. 22, 2013.

(51) Int. Cl.
*A63F 13/215* (2014.01)
*A63F 13/35* (2014.01)
*H04R 3/00* (2006.01)

NETWORKED GAMING HEADSET

CLAIM OF PRIORITY

This patent application is a continuation of U.S. patent application Ser. No. 14/477,421, filed on Sep. 4, 2014, which in turn makes reference to, claims priority to and claims benefit from the U.S. Provisional Patent Application Ser. No. 61/894,161, filed Oct. 22, 2013. Each of the above identified applications is hereby incorporated herein by reference in its entirety.

INCORPORATION BY REFERENCE

The entirety of each of the following applications is hereby incorporated herein by reference: U.S. patent application Ser. No. 13/040,144 entitled "Gaming Headset with Programmable Audio" and published as US2012/0014553. The above stated application(s) is hereby incorporated herein by reference in its entirety.

TECHNICAL FIELD

Aspects of the present application relate to electronic gaming. More specifically, to methods and systems for networked gaming headset.

BACKGROUND

Limitations and disadvantages of conventional approaches to audio processing for gaming will become apparent to one of skill in the art, through comparison of such approaches with some aspects of the present method and system set forth in the remainder of this disclosure with reference to the drawings.

BRIEF SUMMARY

Methods and systems are provided for networked gaming headset, substantially as illustrated by and/or described in connection with at least one of the figures, as set forth more completely in the claims.

DETAILED DESCRIPTION

Figure 1A:
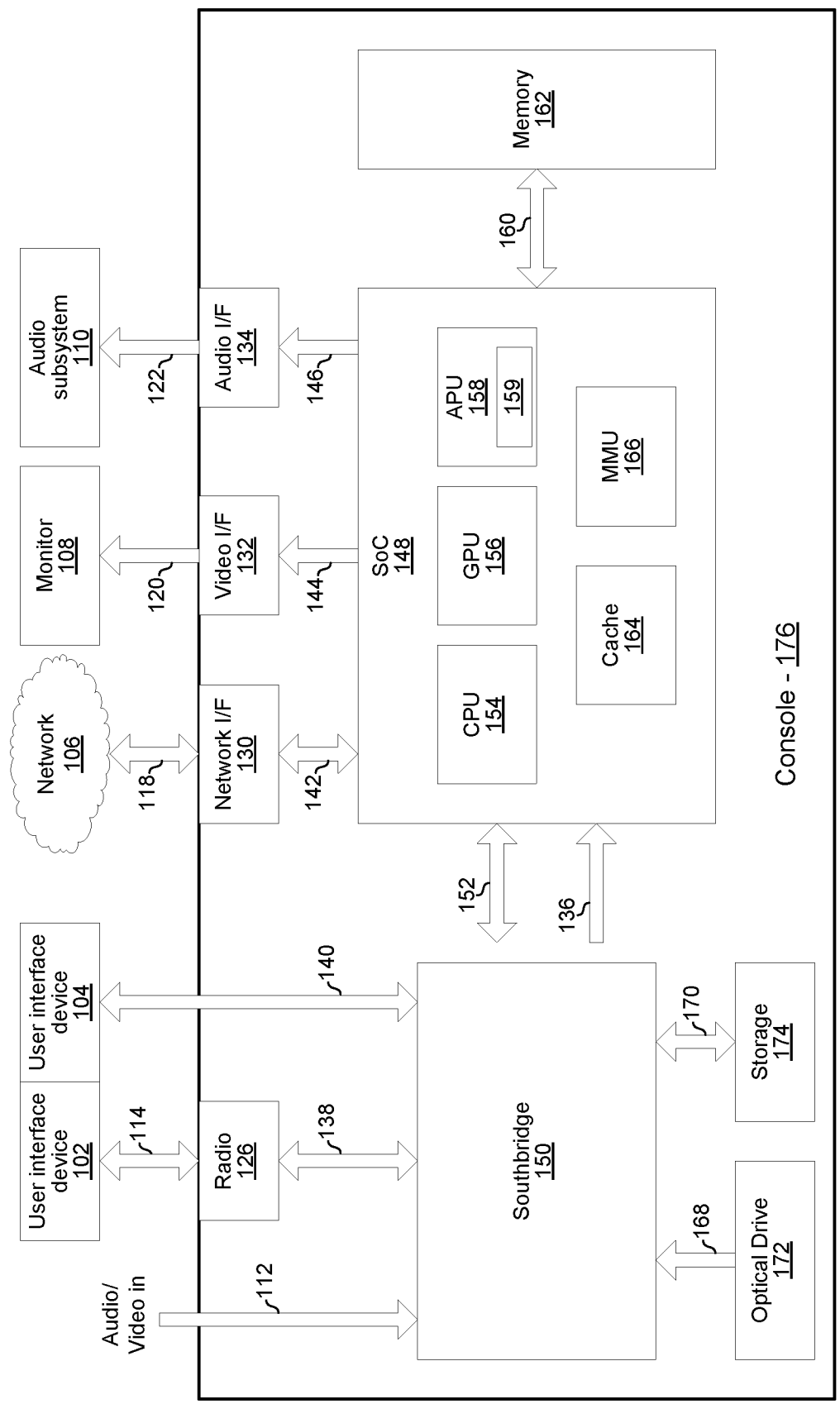
FIG. 1A depicts an example gaming console.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set $\{(x), (y), (x, y)\}$. As another example, "x, y, and/or z" means any element of the seven-element set $\{(x), (y), (z), (x, y), (x, z), (y, z), (x, y, z)\}$. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled, or not enabled, by some user-configurable setting.

Referring to FIG. 1, there is shown game console 176 which may be, for example, a Windows computing device, a UNIX computing device, a Linux computing device, an Apple OSX computing device, an Apple iOS computing device, an Android computing device, a Microsoft Xbox, a Sony Playstation, a Nintendo Wii, or the like. The example game console 176 comprises a video interface 124, radio 126, data interface 128, network interface 130, video interface 132, audio interface 134, southbridge 150, main system on chip (SoC) 148, memory 162, optical drive 172, and storage device 174. The SoC 148 comprises central processing unit (CPU) 154, graphics processing unit (GPU) 156, audio processing unit (APU) 158, cache memory 164, and memory management unit (MMU) 166. The various components of the game console 176 are communicatively coupled through various busses/links 112, 138, 140, 142, 144, 146, 152, 136, 160, 168, and 170.

The southbridge 150 comprises circuitry that supports one or more data bus protocols such as High-Definition Multimedia Interface (HDMI), Universal Serial Bus (USB), Serial Advanced Technology Attachment 2 (SATA 2), embedded multimedia card interface (e.MMC), Peripheral Component Interconnect Express (PCIe), or the like. The southbridge 150 may receive audio and/or video from an external source via link 112 (e.g., HDMI), from the optical drive (e.g., Blu-Ray) 172 via link 168 (e.g., SATA 2), and/or from storage 174 (e.g., hard drive, FLASH memory, or the like) via link 170 (e.g., SATA 2 and/or e.MMC). Digital audio and/or video is output to the SoC 148 via link 136 (e.g., CEA-861-E compliant video and IEC 61937 compliant audio). The southbridge 150 exchanges data with radio 126 via link 138 (e.g., USB), with external devices via link 140 (e.g., USB), with the storage 174 via the link 170, and with the SoC 148 via the link 152 (e.g., PCIe).

The radio 126 comprises circuitry operable to communicate in accordance with one or more wireless standards such as the IEEE 802.11 family of standards, the Bluetooth family of standards, and/or the like.

The network interface 130 may comprise circuitry operable to communicate in accordance with one or more wired standards and to convert between wired standards. For example, the network interface 130 may communicate with the SoC 148 via link 142 using a first standard (e.g., PCIe) and may communicate with the network 106 using a second standard (e.g., gigabit Ethernet).

The video interface 132 may comprise circuitry operable to communicate video in accordance with one or more wired or wireless video transmission standards. For example, the video interface 132 may receive CEA-861-E compliant video data via link 144 and encapsulate/format/etc., the video data in accordance with an HDMI standard for output to the monitor 108 via an HDMI link 120.

The audio interface 134 may comprise circuitry operable to communicate audio in accordance with one or more wired or wireless audio transmission standards. For example, the audio interface 134 may receive CEA-861-E compliant video data via link 144 and encapsulate/format/etc. the video data in accordance with an HDMI standard for output to the monitor 108 via an HDMI link 120.

The central processing unit (CPU) 154 may comprise circuitry operable to execute instructions for controlling/coordinating the overall operation of the game console 176. Such instructions may be part of an operating system of the console and/or part of one or more software applications running on the console.

The graphics processing unit (GPU) 156 may comprise circuitry operable to perform graphics processing functions such as compression, decompression, encoding, decoding, 3D rendering, and/or the like.

The audio processing unit (APU) 158 may comprise circuitry operable to perform audio processing functions such as volume/gain control, compression, decompression, encoding, decoding, surround-sound processing, and/or the like to output single channel or multi-channel (e.g., 2 channels for stereo or 5, 7, or more channels for surround sound) audio signals. The APU 158 comprises memory (e.g., volatile and/or nonvolatile memory) 159 which stores parameter settings that affect processing of audio by the APU 158. For example, the parameter settings may include a first audio gain/volume setting that determines, at least in part, a volume of game audio output by the console 176 and a second audio gain/volume setting that determines, at least in part, a volume of chat audio output by the console 176. The parameter settings may be modified via a graphical user interface (GUI) of the console and/or via an application programming interface (API) provided by the console 176.

The cache memory 164 comprises high-speed memory (typically DRAM) for use by the CPU 154, GPU 156, and/or APU 158. The memory 162 may comprise additional memory for use by the CPU 154, GPU 156, and/or APU 158. The memory 162, typically DRAM, may operate at a slower speed than the cache memory 164 but may also be less expensive than cache memory as well as operate at a higher-speed than the memory of the storage device 174. The MMU 166 controls accesses by the CPU 154, GPU 156, and/or APU 158 to the memory 162, the cache 164, and/or the storage device 174.

In FIG. 1A, the example game console 176 is communicatively coupled to a user interface device 102, a user interface device 104, a network 106, a monitor 108, and audio subsystem 110.

Each of the user interface devices 102 and 104 may comprise, for example, a game controller, a keyboard, a motion sensor/position tracker, or the like. The user interface device 102 communicates with the game console 176 wirelessly via link 114 (e.g., Wi-Fi Direct, Bluetooth, and/or the like). The user interface device 102 communicates with the game console 176 via the wired link 140 (e.g., USB or the like).

The network 160 comprises a local area network and/or a wide area network. The game console 176 communicates with the network 106 via wired link 118 (e.g., Gigabit Ethernet).

The monitor 108 may be, for example, a LCD, OLED, or PLASMA screen. The game console 176 sends video to the monitor 108 via link 120 (e.g., HDMI).

The audio subsystem 110 may be, for example, a headset, a combination of headset and audio basestation, or a set of speakers and accompanying audio processing circuitry. The game console 176 sends audio to the subsystem 110 via link(s) 122 (e.g., S/PDIF for digital audio or "line out" for analog audio). Additional details of an example audio subsystem 110 are described below.

Figure 1B:
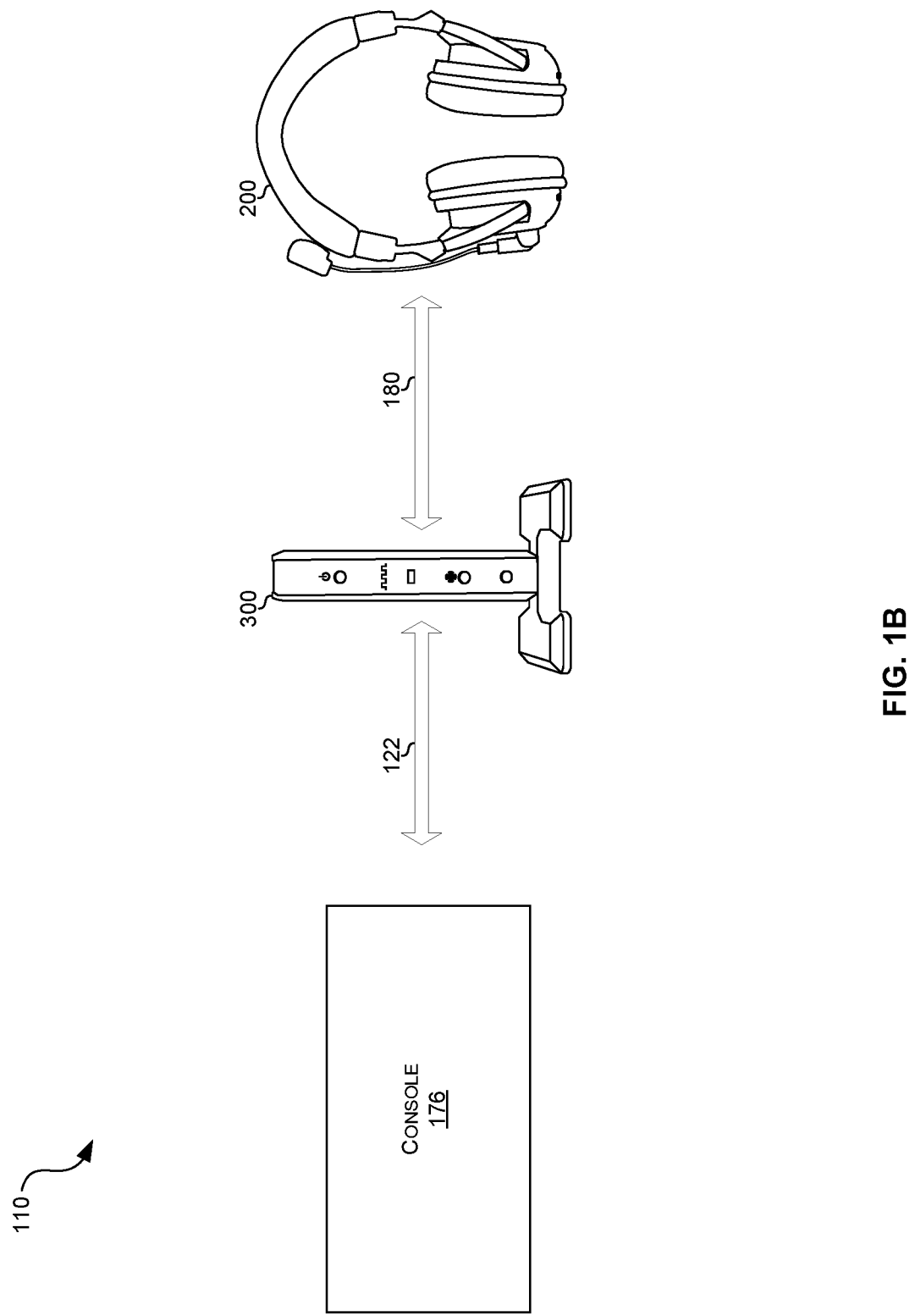
FIG. 1B depicts an example gaming audio subsystem comprising a headset and an audio basestation.
Figure 1C:
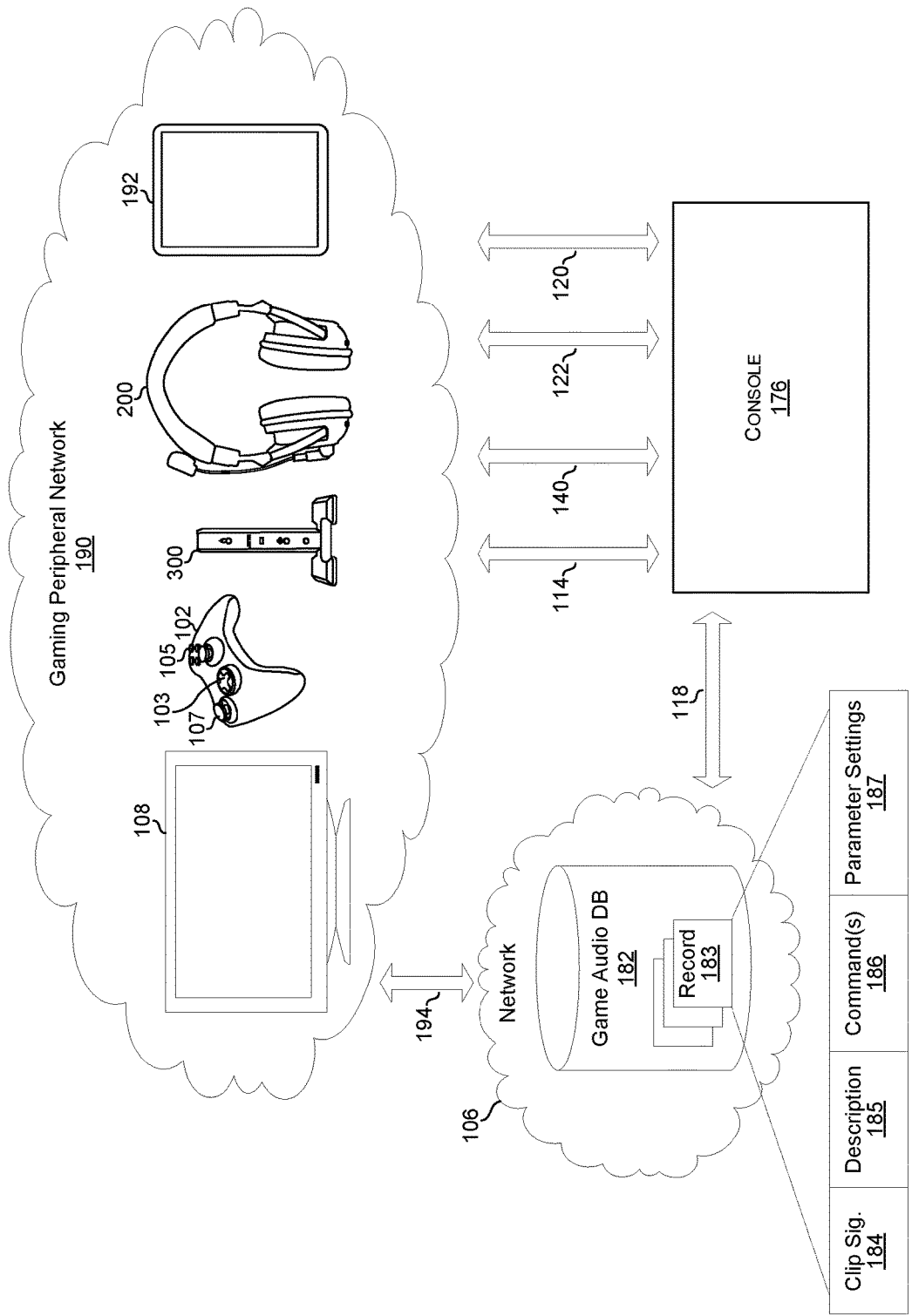
FIG. 1C depicts the example gaming console and an associated network of peripheral devices.

FIG. 1B depicts an example gaming audio subsystem comprising a headset and an audio basestation. Shown is a headset 200 and an audio basestation 300. The headset 200 communicates with the basestation 300 via a link 180 and the basestation 300 communicates with the console 176 via a link 122. The link 122 may be as described above. In an example implementation, the link 180 may be a proprietary wireless link operating in an unlicensed frequency band. The headset 200 may be as described below with reference to FIGS. 2A-2C. The basestation 300 may be as described below with reference to FIGS. 3A-3B.

Referring to FIG. 1C, again shown is the console 176 connected to a plurality of peripheral devices and a network 106. The example peripheral devices shown include a monitor 108, a user interface device 102, a headset 200, an audio basestation 300, and a multi-purpose device 192.

The monitor 108 and user interface device 102 are as described above. An example implementation of the headset 200 is described below with reference to FIGS. 2A-2C. An example implementation of the audio basestation is described below with reference to FIGS. 3A-3B.

The multi-purpose device 192 may be, for example, a tablet computer, a smartphone, a laptop computer, or the like and that runs an operating system such as Android, Linux, Windows, iOS, OSX, or the like. An example implementation of the multi-purpose device 192 is described below with reference to FIG. 4. Hardware (e.g., a network adaptor) and software (i.e., the operating system and one or more applications loaded onto the device 192) may configure the device 192 for operating as part of the GPN 190. For example, an application running on the device 192 may cause display of a graphical user interface via which a user can access gaming-related data, commands, functions, parameter settings, etc. and via which the user can interact with the console 176 and the other devices of the GPN 190 to enhance his/her gaming experience.

The peripheral devices 102, 108, 192, 200, 300 are in communication with one another via a plurality of wired and/or wireless links (represented visually by the placement of the devices in the cloud of GPN 190). Each of the peripheral devices in the gaming peripheral network (GPN) 190 may communicate with one or more others of the peripheral devices in the GPN 190 in a single-hop or multi-hop fashion. For example, the headset 200 may communicate with the basestation 300 in a single hop (e.g., over a proprietary RF link) and with the device 192 in a single hop (e.g., over a Bluetooth or Wi-Fi direct link), while the tablet may communicate with the basestation 300 in two hops via the headset 200. As another example, the user interface device 102 may communicate with the headset 200 in a single hop (e.g., over a Bluetooth or Wi-Fi direct link) and with the device 192 in a single hop (e.g., over a Bluetooth or Wi-Fi direct link), while the device 192 may communicate with the headset 200 in two hops via the user interface device 102. These example interconnections among the peripheral devices of the GPN 190 are merely examples, any number and/or types of links among the devices of the GPN 190 is possible.

The GPN 190 may communicate with the console 176 via any one or more of the connections 114, 140, 122, and 120 described above. The GPN 190 may communicate with a network 106 via one or more links 194 each of which may be, for example, Wi-Fi, wired Ethernet, and/or the like.

A database 182 which stores gaming audio data is accessible via the network 106. The gaming audio data may comprise, for example, signatures of particular audio clips (e.g., individual sounds or collections or sequences of sounds) that are part of the game audio of particular games, of particular levels/scenarios of particular games, particular characters of particular games, etc. In an example implementation, the database 182 may comprise a plurality of records 183, where each record 183 comprises an audio clip (or signature of the clip) 184, a description of the clip 184 (e.g., the game it is from, when it occurs in the game, etc.), one or more gaming commands 186 associated with the clip, one or more parameter settings 187 associated with the clip, and/or other data associated with the audio clip. Records 183 of the database 182 may be downloadable to, or accessed in real-time by, one of more devices of the GPN 190.

Figure 2A:
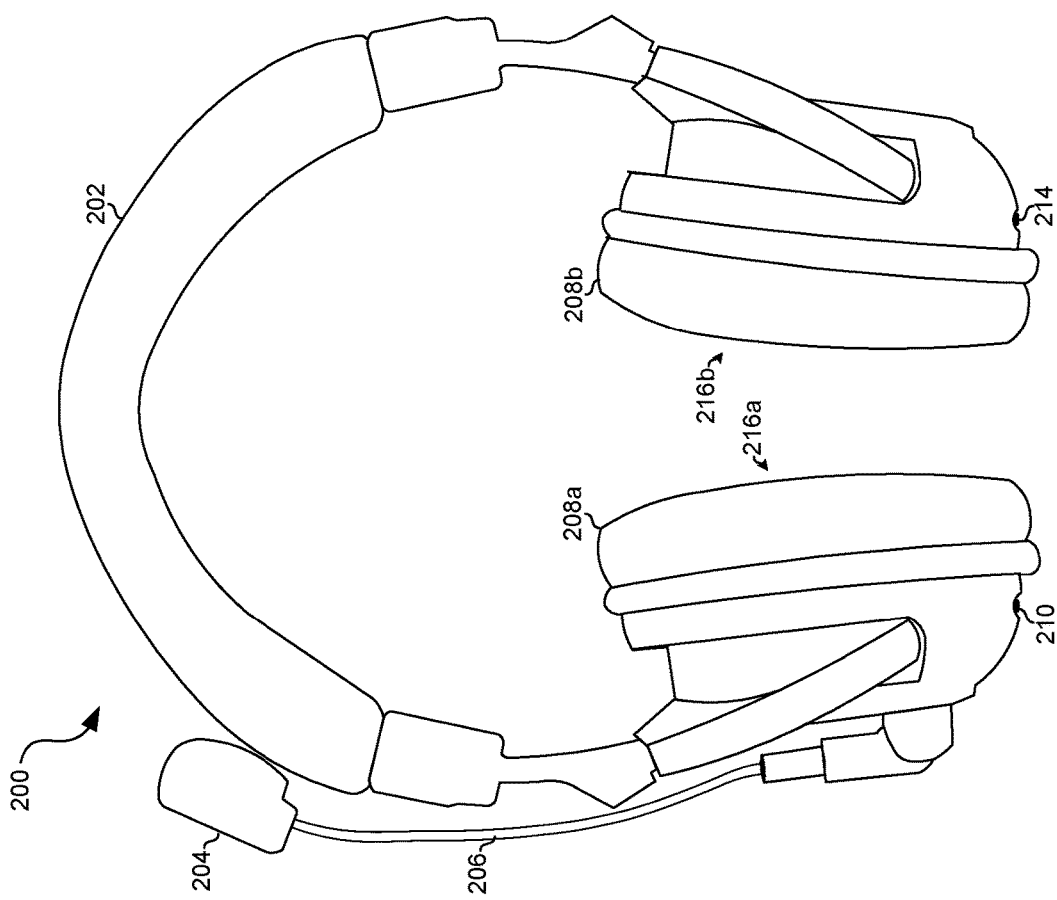
FIGS. 2A and 2B depict two views of an example embodiment of a gaming headset.
Figure 2B:
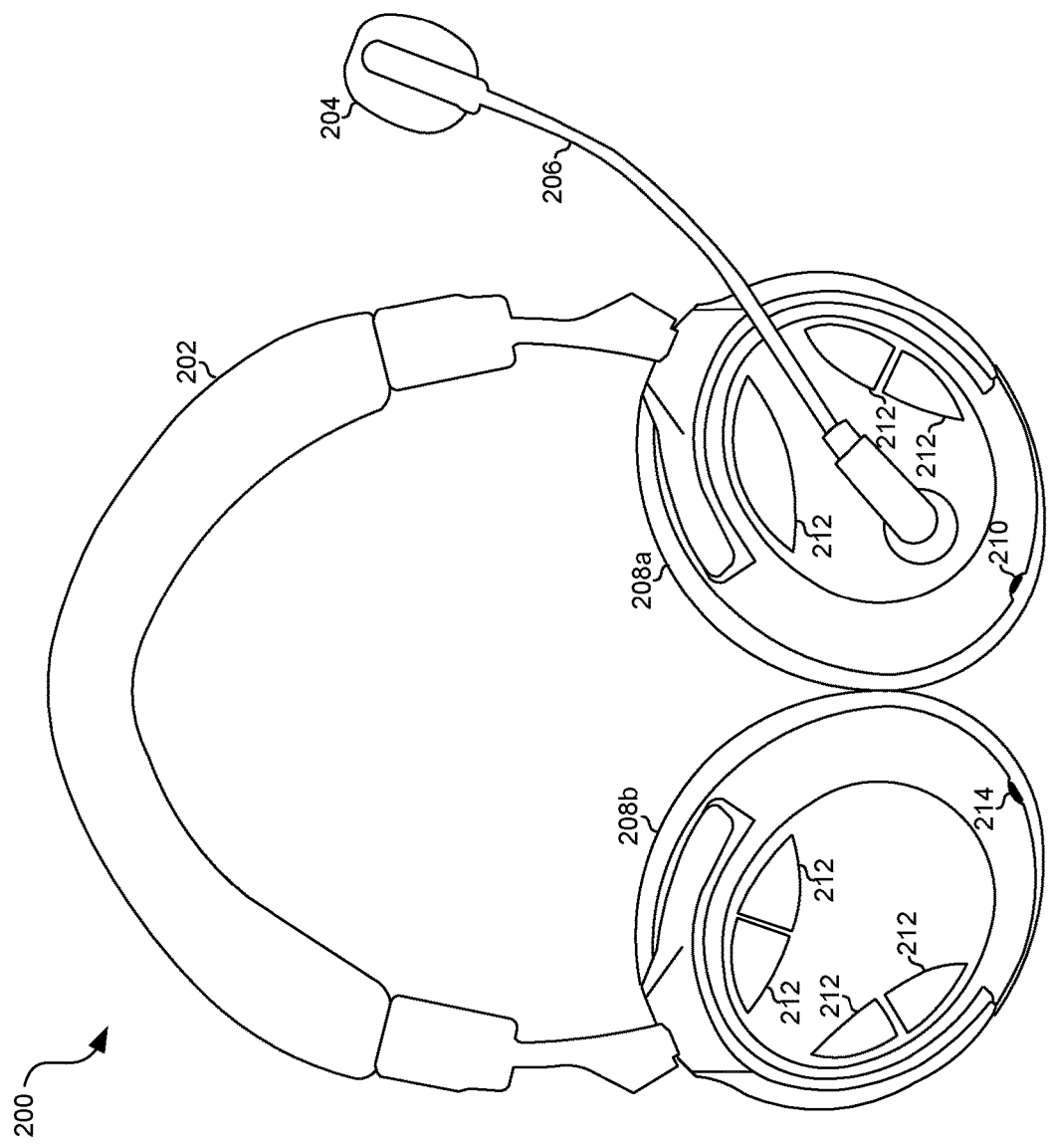

Referring to FIGS. 2A and 2B, there is shown two views of an example headset 200 that may present audio output by a gaming console such as the console 176. The headset 200 comprises a headband 202, a microphone boom 206 with microphone 204, ear cups 208a and 208b which surround speakers 216a and 216b, connector 210, connector 214, and user controls 212.

The connector 210 may be, for example, a 3.5 mm headphone socket for receiving analog audio signals (e.g., receiving chat audio via an Xbox "talkback" cable).

The microphone 204 converts acoustic waves (e.g., the voice of the person wearing the headset) to electric signals for processing by circuitry of the headset and/or for output to a device (e.g., console 176, basestation 300, a smartphone, and/or the like) that is in communication with the headset.

The speakers 216a and 216b convert electrical signals to soundwaves.

The user controls 212 may comprise dedicated and/or programmable buttons, switches, sliders, wheels, etc. for performing various functions. Example functions which the controls 212 may be configured to perform include: power the headset 200 on/off, mute/unmute the microphone 204, control gain/volume of, and/or effects applied to, chat audio by the audio processing circuitry of the headset 200, control gain/volume of, and/or effects applied to, game audio by the audio processing circuitry of the headset 200, enable/disable/initiate pairing (e.g., via Bluetooth, Wi-Fi direct, or the like) with another computing device, and/or the like.

The connector 214 may be, for example, a USB port. The connector 214 may be used for downloading data to the headset 200 from another computing device and/or uploading data from the headset 200 to another computing device. Such data may include, for example, parameter settings (described below). Additionally, or alternatively, the connector 214 may be used for communicating with another computing device such as a smartphone, tablet compute, laptop computer, or the like.

Figure 2C:
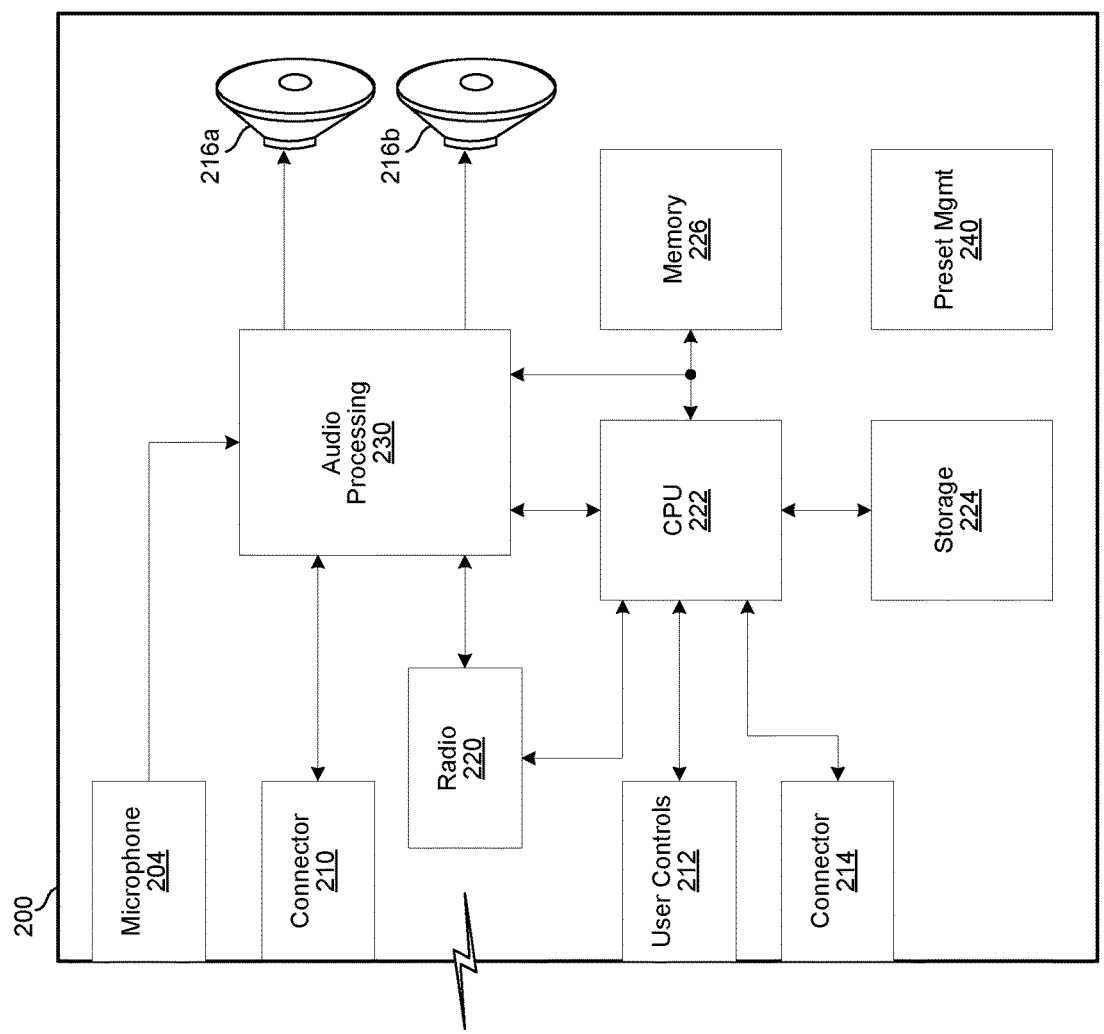
FIG. 2C depicts a block diagram of the example headset of FIGS. 2A and 2B.

FIG. 2C depicts a block diagram of the example headset 200. In addition to the connector 210, user controls 212, connector 214, microphone 204, and speakers 216a and 216b already discussed, shown are a radio 220, a CPU 222, a storage device 224, a memory 226, an audio processing circuit 230, and a headset preset management component 240.

The radio 220 may comprise circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for receiving audio from an audio basestation such as the basestation 300).

The CPU 222 may comprise circuitry operable to execute instructions for controlling/coordinating the overall operation of the headset 200. Such instructions may be part of an operating system or state machine of the headset 200 and/or part of one or more software applications running on the headset 200. In some implementations, the CPU 222 may be, for example, a programmable interrupt controller, a state machine, or the like.

The storage device 224 may comprise, for example, FLASH or other nonvolatile memory for storing data which may be used by the CPU 222 and/or the audio processing circuitry 230. Such data may include, for example, parameter settings that affect processing of audio signals in the headset 200 and parameter settings that affect functions performed by the user controls 212. For example, one or more parameter settings may determine, at least in part, a gain of one or more gain elements of the audio processing circuitry 230. As another example, one or more parameter settings may determine, at least in part, a frequency response of one or more filters that operate on audio signals in the audio processing circuitry 230. As another example, one or more parameter settings may determine, at least in part, whether and which sound effects are added to audio signals in the audio processing circuitry 230 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the headset 200 in accordance with one or more algorithms, based on user input (e.g., via controls 212), and/or based on input received via one or more of the connectors 210 and 214. In some instances, sets of various parameter settings may be predefined for use in configuring headsets and/or controlling operations thereof. Such sets of various parameter settings are referenced in this application as "headset presets."

The memory 226 may comprise volatile memory used by the CPU 230 and/or audio processing circuit 230 as program memory, for storing runtime data, etc.

The audio processing circuit 230 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 230 may be determined, at least in part, by which parameter settings have been selected. The processing may be performed on game, chat, and/or microphone audio that is subsequently output to speaker 216a and 216b. Additionally, or alternatively, the processing may be performed on chat audio that is subsequently output to the connector 210 and/or radio 220.

In an example implementation, the headset 200 may be configured to as networked gaming headset—i.e., to support network access and use thereof in conjunction with operation of the headset. For example, the headset 200 may be configurable to utilize network accessibility to store, share, and/or obtain information relating to use or operation of the headset 200, particularly during multi-player online gaming.

In one particular embodiment, configuring the headset 200 as a networked gaming headset may be done in conjunction with use of headset presets. In this regard, a headset 'headset preset' may comprise a set of values corresponding to one or more configurable parameter settings that are used by or applied to various components of the headset, such as components used in conjunction with audio processing (e.g., to enable adjusting audio characteristics) and/or components pertinent to operation of the headset 200. For example, different headset presets may comprise values applicable to particular configurable parameter settings to produce different audio effects in audio inputs—e.g., audio corresponding to inputs via the microphone 204 of the headset 200. The different configurable input-related parameter settings may be used to, for example, adaptively control how a player's voice—that is a voice of user of the headset 200 (e.g., using voice morphing techniques) may sound to listeners of the audio—e.g., other player(s) in multi-player online game. Different headset presets may also comprise values applicable to particular configurable parameter settings to produce different audio effects in audio outputs—e.g., outputs via the speakers 216a and 216b of the headset 200. For example, the different configurable output-related parameter settings may be used to, for example, variably control equalizer settings, to control how voices of other players may sound. Also, different headset presets may comprise different headset operation-related parameter settings. For example, different headset presets may comprise values applicable to particular configurable parameter settings that may provide for different functionality of re-definable inputs (e.g., buttons or switches) on the headset 200.

To support configuring and/or operation of the headset 200 as a network gaming headset, dedicated components may be used and/or incorporated into the headset 200 and/or existing components may be modified or adjusted. The headset 200 may incorporate, for example, the headset preset management component 240, which may comprise suitable circuitry for managing headset presets and use thereof in the headset 200. For example, the headset preset management component 240 may be configured to manage generation, storage, sharing, and/or obtaining headset presets in the headset 200. In another example implementation, the functions of the preset management circuitry 240 may be integrated into the other components (e.g., CPU 222) of the headset 200.

In some instances, headset presets may be stored in and/or obtained from remote, dedicated resources. For example, a centralized headset preset depository may be utilized. Headset presets may be uploaded to or downloaded from the depository to enable sharing or exchanging (i.e. for value, as further explained below) of headset presets among players. Such use scenario is described in more detail with respect to, for example, FIG. 5.

Figure 3A:
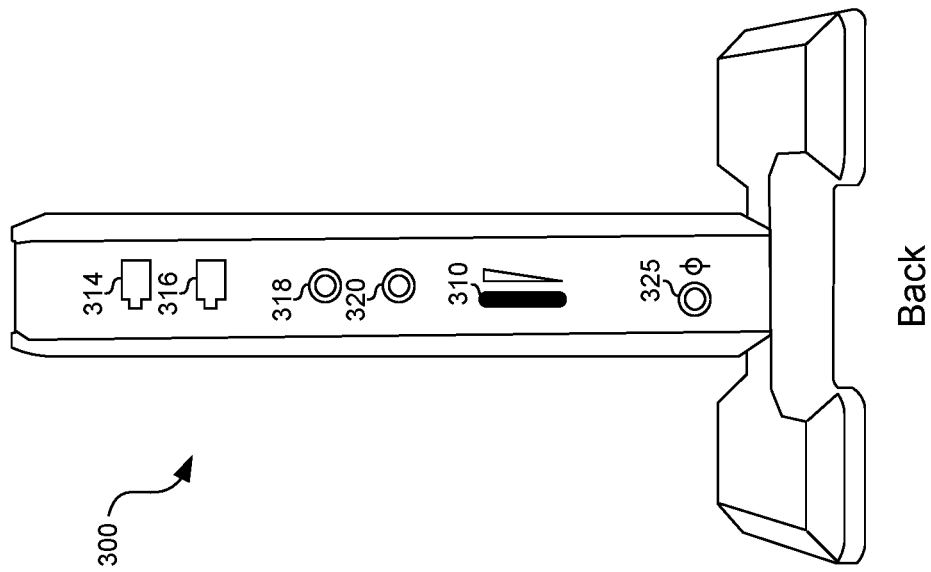
FIG. 3A depicts two views of an example embodiment of an audio basestation.
Figure 3A:
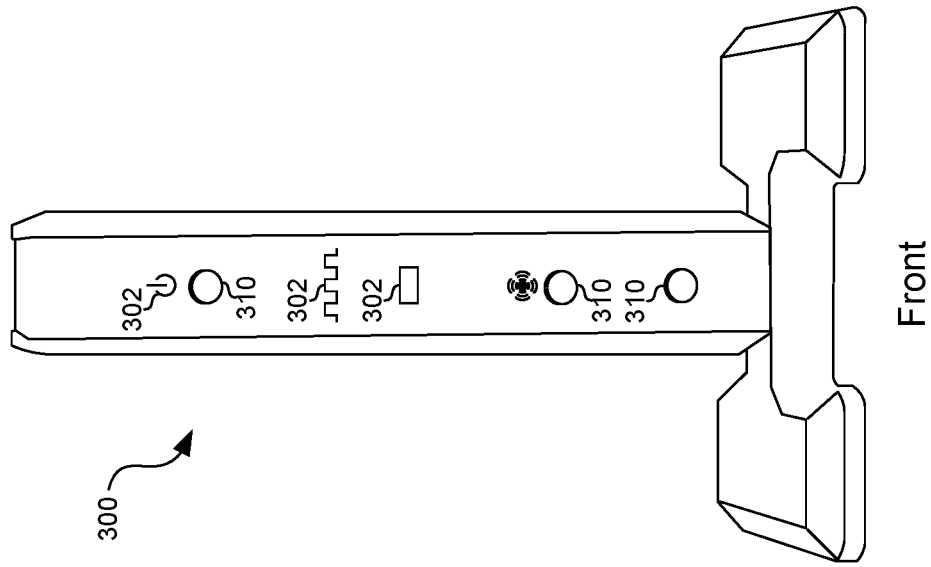

FIG. 3A depicts two views of an example embodiment of the audio basestation 300. The basestation 300 comprises status indicators 302, user controls 310, power port 325, and audio connectors 314, 316, 318, and 320.

The audio connectors 314 and 316 may comprise digital audio in and digital audio out (e.g., S/PDIF) connectors, respectively. The audio connectors 318 and 320 may comprise a left "line in" and a right "line in" connector, respectively. The controls 310 may comprise, for example, a power button, a button for enabling/disabling virtual surround sound, a button for adjusting the perceived angles of the speakers when the virtual surround sound is enabled, and a dial for controlling a volume/gain of the audio received via the "line in" connectors 318 and 320. The status indicators 302 may indicate, for example, whether the audio basestation 300 is powered on, whether audio data is being received by the basestation 300 via connectors 314, and/or what type of audio data (e.g., Dolby Digital) is being received by the basestation 300.

Figure 3B:
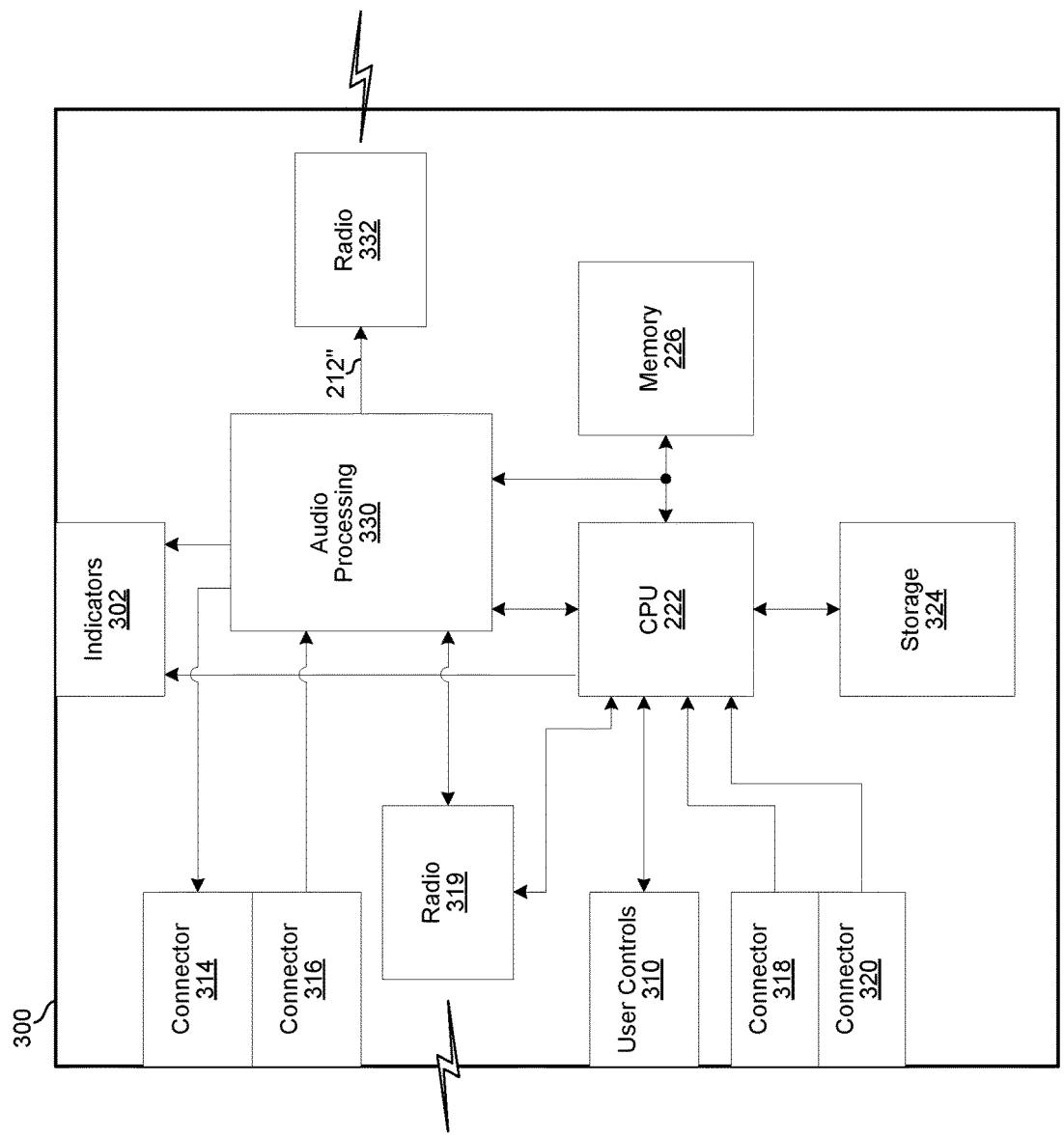
FIG. 3B depicts a block diagram of the audio basestation 400.

FIG. 3B depicts a block diagram of the audio basestation 300. In addition to the user controls 310, indicators 302, and connectors 314, 316, 318, and 320 described above, the block diagram additionally shows a CPU 322, a storage device 324, a memory 326, a radio 319, an audio processing circuit 330, and a radio 332.

The radio 319 comprises circuitry operable to communicate in accordance with one or more standardized (such as the IEEE 802.11 family of standards, the Bluetooth family of standards, and/or the like) and/or proprietary (e.g., proprietary protocol for receiving audio protocols for receiving audio from a console such as the console 176.) wireless protocols.

The radio 332 comprises circuitry operable to communicate in accordance with one or more standardized (such as, for example, the IEEE 802.11 family of standards, the Bluetooth family of standards, and/or the like) and/or proprietary wireless protocol(s) (e.g., a proprietary protocol for transmitting audio to headphones 200).

The CPU 322 comprises circuitry operable to execute instructions for controlling/coordinating the overall operation of the audio basestation 300. Such instructions may be part of an operating system or state machine of the audio basestation 300 and/or part of one or more software applications running on the audio basestation 300. In some implementations, the CPU 322 may be, for example, a programmable interrupt controller, a state machine, or the like.

The storage 324 may comprise, for example, FLASH or other nonvolatile memory for storing data which may be used by the CPU 322 and/or the audio processing circuitry 330. Such data may include, for example, parameter settings that affect processing of audio signals in the basestation 300. For example, one or more parameter settings may determine, at least in part, a gain of one or gain elements of the audio processing circuitry 330. As another example, one or more parameter settings may determine, at least in part, a frequency response of one or more filters that operate on audio signals in the audio processing circuitry 330. As another example, one or more parameter settings may determine, at least in part, whether and which sound effects are added to audio signals in the audio processing circuitry 330 (e.g., which effects to add to microphone audio to morph the user's voice). Example parameter settings which affect audio processing are described in the co-pending U.S. patent application Ser. No. 13/040,144 titled "Gaming Headset with Programmable Audio" and published as US2012/0014553, the entirety of which is hereby incorporated herein by reference. Particular parameter settings may be selected autonomously by the basestation 300 in accordance with one or more algorithms, based on user input (e.g., via controls 310), and/or based on input received via one or more of the connectors 314, 316, 318, and 320.

The memory 326 may comprise volatile memory used by the CPU 322 and/or audio processing circuit 330 as program memory, for storing runtime data, etc.

The audio processing circuit 330 may comprise circuitry operable to perform audio processing functions such as volume/gain control, compression, decompression, encoding, decoding, introduction of audio effects (e.g., echo, phasing, virtual surround effect, etc.), and/or the like. As described above, the processing performed by the audio processing circuit 330 may be determined, at least in part, by which parameter settings have been selected. The processing may be performed on game and/or chat audio signals that are subsequently output to a device (e.g., headset 200) in communication with the basestation 300. Additionally, or alternatively, the processing may be performed on a microphone audio signal that is subsequently output to a device (e.g., console 176) in communication with the basestation 300.

Figure 4:
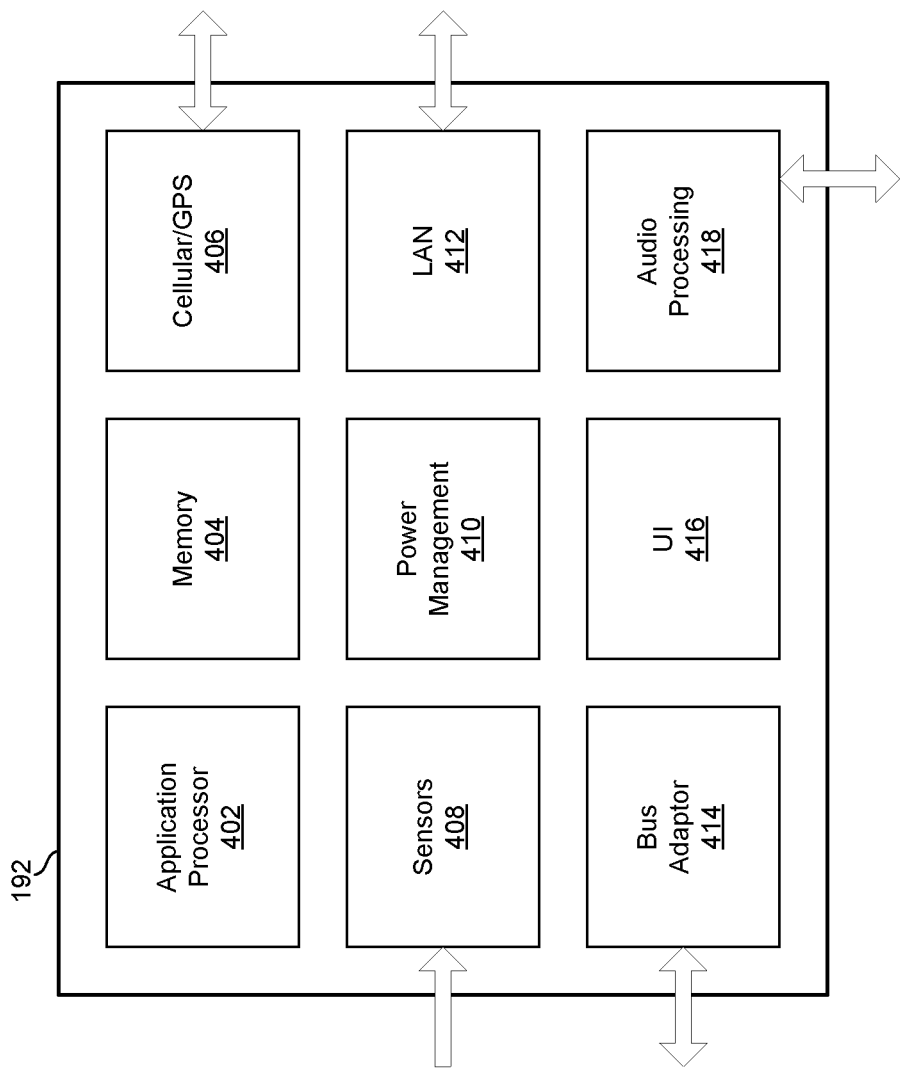
FIG. 4 depicts a block diagram of an example multi-purpose device.

FIG. 4 depicts a block diagram of an example multi-purpose device 192. The example multi-purpose device 192 comprises a an application processor 402, memory subsystem 404, a cellular/GPS networking subsystem 406, sensors 408, power management subsystem 410, LAN subsystem 412, bus adaptor 414, user interface subsystem 416, and audio processor 418.

The application processor 402 comprises circuitry operable to execute instructions for controlling/coordinating the overall operation of the multi-purpose device 192 as well as graphics processing functions of the multi-purpose device 402. Such instructions may be part of an operating system of the multi-purpose device 192 and/or part of one or more software applications running on the multi-purpose device 192.

The memory subsystem 404 comprises volatile memory for storing runtime data, nonvolatile memory for mass storage and long-term storage, and/or a memory controller which controls reads writes to memory.

The cellular/GPS networking subsystem 406 comprises circuitry operable to perform baseband processing and analog/RF processing for transmission and reception of cellular and GPS signals.

The sensors 408 comprise, for example, a camera, a gyroscope, an accelerometer, a biometric sensor, and/or the like.

The power management subsystem 410 comprises circuitry operable to manage distribution of power among the various components of the multi-purpose device 192.

The LAN subsystem 412 comprises circuitry operable to perform baseband processing and analog/RF processing for transmission and reception of wired, optical, and/or wireless signals (e.g., in accordance Wi-Fi, Wi-Fi Direct, Bluetooth, Ethernet, and/or the other standards).

The bus adaptor 414 comprises circuitry for interfacing one or more internal data busses of the multi-purpose device with an external bus (e.g., a Universal Serial Bus) for transferring data to/from the multi-purpose device via a wired connection.

The user interface subsystem 416 comprises circuitry operable to control and relay signals to/from a touchscreen, hard buttons, and/or other input devices of the multi-purpose device 192.

The audio processor 418 comprises circuitry to process (e.g., digital to analog conversion, analog-to-digital conversion, compression, decompression, encryption, decryption, resampling, etc.) audio signals. The audio processor 418 may be operable to receive and/or output signals via a connector such as a 3.5 mm stereo and microphone connector.

Figure 5:
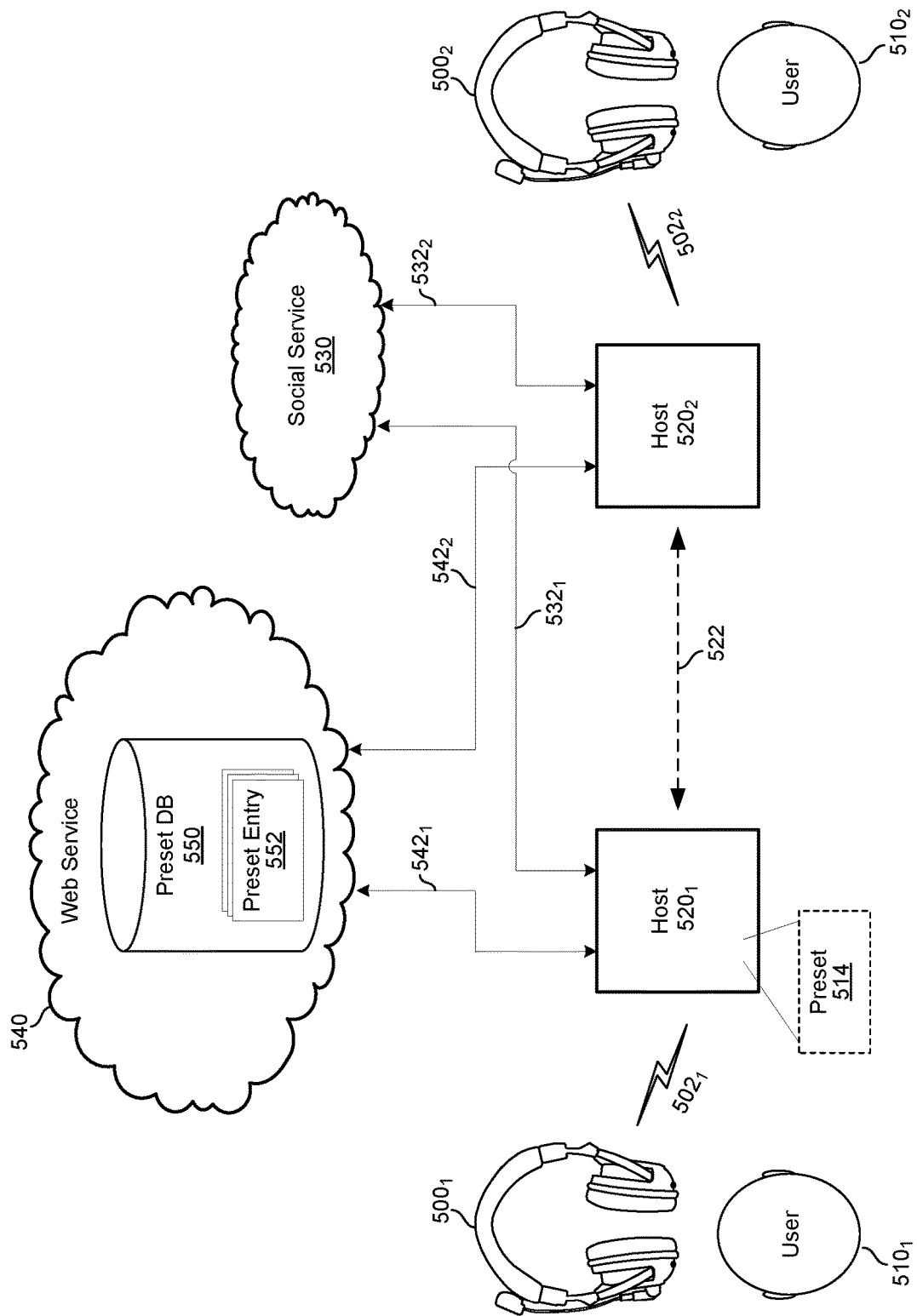
FIG. 5 depicts a block diagram illustrating use of networked gaming headsets, such as to generate, store, and/or obtain headset presets.

FIG. 5 depicts a block diagram illustrating use of networked gaming headsets, such as to generate, store, and/or obtain headset presets. Referring to FIG. 5, there is shown headsets $500_1$ and $500_2$, hosts $520_1$ and $520_2$, social service 530, and web service 540.

Each of the headsets $500_1$ and $500_2$ may be similar to the headset 200, for example. In this regard, the headsets $500_1$ and $500_2$ may be utilized by users $510_1$ and $510_2$, respectively, to facilitate outputting audio (e.g., via speakers of the headsets) to the users $510_1$ and $510_2$ (including performing necessary audio processing related thereto). Furthermore, the headsets $500_1$ and $500_2$ may also be utilized in capturing audio (e.g., via microphones) from the users $510_1$ and $510_2$, and processing the audio input, and (in some instances) communicating the audio (e.g., to other users, such as during online gaming).

The headsets $500_1$ and $500_2$ may be coupled to the hosts $520_1$ and $520_2$, respectively (e.g., via connections $502_1$ and $502_2$). In this regard, each of the hosts $520_1$ and $520_2$ may comprise suitable circuitry for supporting operation of headsets (e.g., the headsets $500_1$ and $500_2$). For example, the hosts $520_1$ and $520_2$ may be configured for providing or supporting such functions as processing (audio and/or non-audio), storage, networking, and the like, which may be needed during operation of the headsets $500_1$ and $500_2$. In an example embodiment, each of the hosts $520_1$ and $520_2$ may correspond to (at least a portion of) a combination of a game console (e.g., similar to the game console 176) and a basestation (e.g., similar to the basestation 300), with the connections $502_1$ and $502_2$ comprising wireless links (e.g., similar to the link 180). The disclosure is not so limited, however, and in some instances a host $520_i$ may correspond to any suitable electronic device or system which may be configured to perform any of the operations or functions described with respect to the hosts $520_1$ and $520_2$.

In operation, the combinations of headset $500_1$/host $520_1$ and headset $500_2$/host $520_2$ may be operable to support processing and/or communication of audio associated with the two different users (players) $510_1$ and $510_2$, such as during multi-player online gaming, for example.

In some instances, the headsets $500_1$ and $500_2$ may be configured as networked gaming headsets. Networked gaming headsets may use their network connections to share and/or exchange (e.g., for value), directly and/or indirectly (e.g., via intermediary media or systems), data during (and/or relating to) online gaming. In the particular example use scenario shown in FIG. 5, the headsets $500_1$ and $500_2$ may support generation and sharing of headset presets. As described in more detail with respect to FIG. 2C, headset presets may comprise information relating to configuring one or more parameter settings that are used during processing or operation of headsets. Each combination of headset $500_i$/host $520_i$ ('i' is an integer) may be used, for example, to generate headset presets. For example, the combination of headset $500_1$/host $520_1$ may be utilized in generating a headset preset 514, which may define values applicable to one or more configurable parameter settings used in the headset $500_1$ (e.g., parameter settings relating to input audio, output audio, and/or control of the audio or headset). In some instances, each headset preset may be assigned an identifier (e.g., token) which may be set such that to enable uniquely identifying the headset preset.

The headset preset 514 may be stored, at least initially, locally—e.g., within the host 520₁ and/or the headset 500₁. In networked gaming use scenarios, however, headset presets may be stored remotely and/or shared (or exchanged for value) among players. For example, a web-based service 540 may be utilized to provide an online, centralized depository of data, including headset presets. The web-based service 540 may be configured on a plurality of hardware resources (e.g., storage elements, processing elements, routing elements, etc.), using suitable software (and firmware) solutions, such as for managing operations of the web-based service 540, and/or for controlling or supporting applications or functions associated with the web-based service 540. The web-based service 540 may be configured to support such functions, for example, as remote storage of headset presets, and sharing or exchanging of these headset presets. For example, the web-based service 540 may comprise a headset preset database (DB) 550, which may be used to store a plurality of present entries 552. Accordingly, headset presets may be uploaded by players into the web-based service 540, and stored therein. For example, once the headset preset 514 is generated, the headset preset 514 may associated with an identifier (e.g., based on player/user 510₁ command or selection) for remote storage. Accordingly, the host 520₁ may establish connection 542₁ to the web-based service 540, and may utilize that connection to upload the headset preset 514 and/or its identifier into the headset preset DB 550.

The players may then share or exchange headset presets, using the remotely stored copies thereof (in the web-based service 540). The sharing or exchanging of the headset presets may be done by sharing or exchanging information that enable retrieving them from the online remote depository. For example, since each headset preset may be assigned a unique token, tokens may be shared between the players, with the token then being used for downloading the corresponding headset presets from the online central depository. The sharing of the tokens (or other information that may be used to facilitate accessing and retrieving of the headset presets) may be done over direct peer-to-peer connection. For example, hosts 520₁ and 520₂ may establish direct peer-to-peer connection 522, which player 510₁ may then use the direct peer-to-peer connection 522 to send player 510₂ the token identifying the headset preset 514. Alternatively, tokens (or similar information) may be shared using indirect connection. For example, existing web-based social services (an example of which, web-based social service 530 is shown), which may inherently offer measures for ensuring confidential and validated user-to-user connections, may be used. As shown in FIG. 5, the hosts 520₁ and 520₂ may establish, respectively, connections 532₁ and 532₂ to the web-based social service 530. Additionally, or alternatively, tokens that identify headset presets may be shared via email, SMS, MMS, or the like.

The shared token (and/or other necessary information) may be provided to the web-based service 540, which may then download the corresponding headset preset to the headset of the other player. For example, once the first player 510₁ shares the token (and/or other necessary information) with the second player 510₂ (directly, or via the web-based social service 530), the second player 510₂ may provide the token to the web-based service 540. In this regard, the host 520₂ may establish a connection 542₂ to the web-based service 540, which may be used in communicating the token to the web-based service 540. The web-based service 540 may then download the corresponding headset preset to the headset 500₂ of the second player 510₂.

The web-based service 540 may be configured to validate players before allowing download of headset presets by the players. The validation of the players may simply be based on providing the correct tokens—i.e., possession or knowledge of tokens associated with headset presets may be interpreted as indication that the player is permitted to download the headset presets. In some instances, additional validation information may be required (e.g., user name, identifier, password, etc.).

In some instances, headset presets (or information related thereto—e.g., tokens) are exchanged conditionally—e.g., for value. For example, headset presets may be traded among players in exchange for things of value in the online games, such as lives, points, tools, skills, virtual money and/or the like. In some instances, headset presets may even be exchanged for monitory compensation (e.g., pay or credit). Accordingly, sharing the headset presets (or information related thereto) may entail negotiating values for the offered headset preset(s).

Figure 6A:
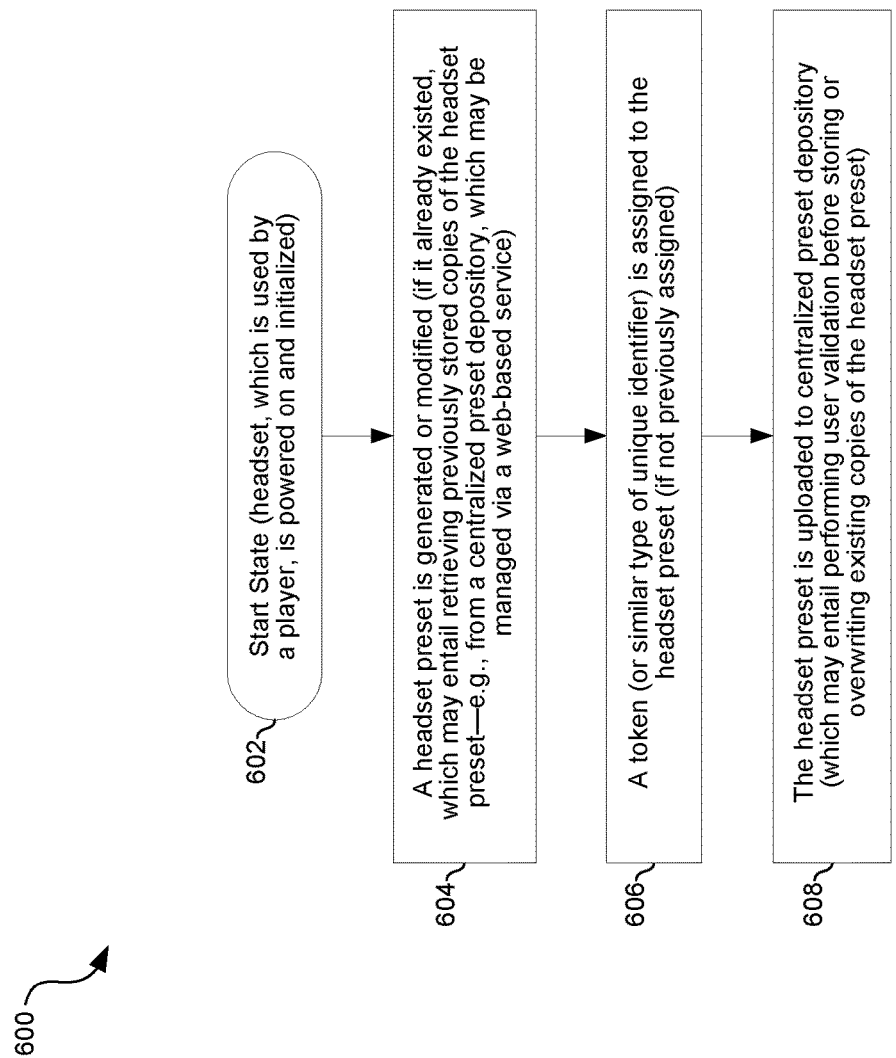
FIG. 6A is a flowchart illustrating an example process for generating and uploading headset presets in networked gaming headsets.

FIG. 6A is a flowchart illustrating an example process for generating and uploading headset presets in networked gaming headsets. Referring to FIG. 6A, there is shown a flow chart 600, comprising a plurality of example steps.

In starting step 602, a headset (e.g., the headset 500₁) may be powered on and/or set to an initial operating state, whereby the headset may be ready for outputting of audio (e.g., microphone audio) and/or handling of input audio (e.g., game and/or chat audio). In step 604, a new headset preset may be generated, or an existing headset preset may be modified (e.g., based on user input or selections. In this regard, modifying existing headset presets may comprise retrieving previously stored copies thereof, for example, from a centralized preset depository (which may be managed via web service, such as the web-based service 540).

In step 606, a token (or similar type of unique identifier) may be assigned to the headset preset (if not previously assigned—e.g., if the headset preset was not an existing one that was simply modified). In some instances, additional information may also be assigned to the headset preset (e.g., for use in validating users accessing them).

In step 608, the headset preset may be uploaded (in lieu of or in addition to storing it locally) to the centralized preset depository. In some instances the uploading may comprise performing user validation before storing new headset presets or overwriting existing copies thereof—e.g., to validate that the user has permission to access and/or use the centralized preset depository and/or the web-based service managing it.

Figure 6B:
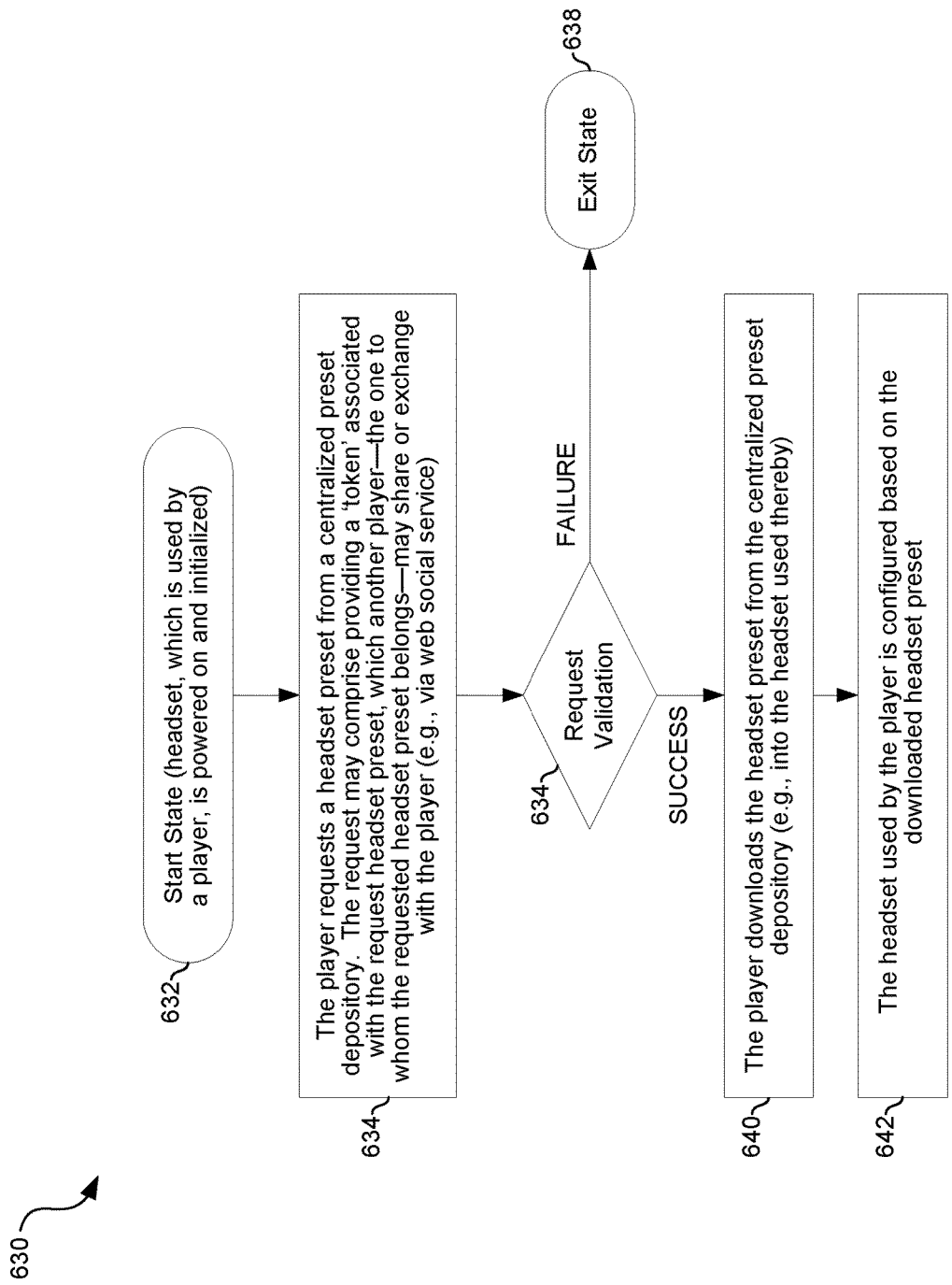
FIG. 6B is a flowchart illustrating an example process for obtaining and using headset presets in networked gaming headsets.

FIG. 6B is a flowchart illustrating an example process for obtaining and using headset presets in networked gaming headsets. Referring to FIG. 6B, there is shown a flow chart 630, comprising a plurality of example steps.

In starting step 602, a headset (e.g., the headset 500₂) may be powered on and/or set to an initial operating state, whereby the headset may be ready for outputting of audio (e.g., microphone audio) and/or handling of input audio (e.g., game and/or chat audio). In step 634, the first player may request a headset preset from a centralized preset depository (which may be managed via web service, such as the web-based service 540). The request may comprise, for example, providing a 'token' associated with the requested headset preset, which a second player—the one to whom the requested headset preset belongs—may have shared with the first player. In this regard, token (or information facilitating access to headset presets) may be shared or exchanged directly (using peer-to-peer connection, such as the connection 522), or indirectly—e.g., via a commonly accessed service, such as the web-based social service 530. In step 636, a request validation may be performed (e.g., in the centralized preset depository, where the headset preset is stored). In an example implementation, the request validation may, at a minimum, comprise validating that the user provided the particular token (or other identifying information) associated with the requested headset preset. Further, the validation may also entail validating the requesting player. In instances where the request validation fails, the process may proceed to an exit state 638. In this regard, the exit state 638 may comprise generating and communicating notification of rejected attempts to obtain the headset preset (e.g., notifications sent to the requesting player and/or the player to whom the headset preset belongs).

Returning to step 636, in instances where the request validation is successful, the process may proceed to step 640. In step 640, the player may download the headset preset from the centralized preset depository (e.g., into the headset used thereby). In step 642, the headset used by the player may be configured based on the downloaded headset preset.

Various embodiments of the invention may comprise a system and a method for networked gaming headsets. For example, in an audio setup (e.g., combination of headset $500_1$/host $520_2$) comprising at least one audio headset (e.g., the headset $500_1$) which may be configurable to process audio for a first player (e.g., player $510_1$) when participating in an online multiplayer game, a headset preset (e.g., headset preset 514) may be configured. In this regard, a headset preset may comprise values for one or more configurable parameter settings relating to operation or functions of the headset $500_1$. A token (or similar identifier) may be assigned to the headset preset. The headset preset may then be uploaded into a central headset preset depository (e.g., the preset DB 550) which may be accessible by a plurality of players. The first player may then share the token, via a network connection, with a second player (e.g., player $510_2$), who may be utilizing a second audio setup (e.g., combination of headset $500_2$/host $520_2$) comprising at least one other audio headset (e.g., the headset $500_2$), which may be configurable to process audio for the second player. Access to the central headset preset depository may be managed via a web-accessed service (e.g., the web-based service 540), which may support web-based user interactions for uploading and/or downloading headset presets. The second player may download the headset preset from the central headset preset depository into the other audio headset. The downloaded headset preset may then be utilized in configuring the other audio headset (used by the second player), for processing audio for the second player participating in the online multiplayer game. The downloading of the headset preset by the second player may only be allowed based on validation of the second player. The second player may be validated based on, for example, the token associated with the headset preset. The token may be shared by the first player with the second player using direct peer-to-peer connection, or via a web-accessed social service (e.g., the web-based social service 530). The headset preset may be shared with the second player based on a negotiation for compensation for sharing of the headset preset. The compensation may be something of value in an online game, for example. The operation or function of the headset may control the sound of the first player's voice in an online chat. The operation or function of the headset may also be a multi-band equalizer. The headset preset may be associated with a particular video game such that the multi-band equalizer may be configured to enhance particular sounds of said particular game.

The present method and/or system may be realized in hardware, software, or a combination of hardware and software. The present methods and/or systems may be realized in a centralized fashion in at least one computing system, or in a distributed fashion where different elements are spread across several interconnected computing systems. Any kind of computing system or other apparatus adapted for carrying out the methods described herein is suited. A typical combination of hardware and software may be a general-purpose computing system with a program or other code that, when being loaded and executed, controls the computing system such that it carries out the methods described herein. Another typical implementation may comprise an application specific integrated circuit or chip. Some implementations may comprise a non-transitory machine-readable (e.g., computer readable) medium (e.g., FLASH drive, optical disk, magnetic storage disk, or the like) having stored thereon one or more lines of code executable by a machine, thereby causing the machine to perform processes as described herein.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. Therefore, it is intended that the present method and/or system not be limited to the particular implementations disclosed, but that the present method and/or system will include all implementations falling within the scope of the appended claims.

What is claimed:

1. A system, comprising:
    at least one headset that is configurable to process audio for a first player participating in an online multiplayer game, the system being operable to:
        receive from a second player, information for facilitating access to a headset preset in a central headset preset depository, wherein:
            the headset preset is uploaded into the central headset preset depository by the second player; and
            the received information comprises identification information for uniquely identifying the headset preset;
        request the headset preset from the central headset preset depository, wherein the request comprises providing both of:
            the identification information; and
            validation information associated with the first player;
        in response to successful validation of the request, download the headset preset from the central headset preset depository into the headset, wherein
            the headset preset comprises values for one or more configurable parameter settings relating to operation or functions of the headset; and
        configure the headset based on the headset preset, for processing audio for the first player participating in the online multiplayer game.

2. The system of claim 1, wherein the identification information comprises a token associated with the headset preset.

3. The system of claim 1, comprising receiving the information from the second player via direct peer-to-peer connection.

4. The system of claim 1, comprising receiving the information from the second player via a web-accessed social service.

5. The system of claim 1, wherein the system is operable to enable negotiation of compensation for downloading of the headset preset.

6. The system of claim 1, wherein the operation or functions of the headset controls voice of the second player in an online chat.

7. The system of claim 1, wherein the operation or functions of the headset is a multi-band equalizer.

8. The system of claim 7, wherein the headset preset is associated with a particular video game, and the multi-band equalizer is operable to enhance particular sounds of the particular game.

9. A method, comprising:
in an audio setup comprising at least one headset that is configurable to process audio for a first player participating in an online multiplayer game:
receiving from a second player, information for facilitating access to a headset preset in a central headset preset depository, wherein:
the headset preset is uploaded into the central headset preset depository by the second player; and
the received information comprises identification information for uniquely identifying the headset preset;
requesting the headset preset from the central headset preset depository, wherein the request comprises providing both of:
the identification information; and
validation information associated with the first player;
in response to successful validation of the request, downloading the headset preset from the central headset preset depository; and
configuring the headset based on the headset preset, for processing audio for the first player participating in the online multiplayer game;
wherein
the headset preset comprises values for one or more configurable parameter settings relating to operation or functions of the headset.

10. The method of claim 9, comprising communicating with the central headset preset depository via web-accessed service that supports web-based user interactions for uploading and/or downloading headset presets.

11. The method of claim 10, comprising receiving at least a portion of the information received from the second player via direct peer-to-peer connection.

12. The method of claim 10, comprising receiving at least a portion of the information received from the second player via a web-accessed social service.

13. The method of claim 10, wherein the identification information comprises a token associated with the headset preset.

14. The method of claim 9, comprising obtaining access to the headset preset in the central headset preset depository based on a negotiation with the second player for compensation for sharing of the headset preset.

15. The method of claim 9, wherein the operation or functions of the headset controls voice of the second player in an online chat.

16. The method of claim 9, wherein the operation or functions of the headset is a multi-band equalizer.

17. The method of claim 16, wherein the headset preset is associated with a particular video game, and further comprising enhancing via the multi-band equalizer particular sounds of the particular game.

* * * * *